March 31, 1936.  L. GUARCELLO  2,036,136

WATER HEATER

Filed Jan. 15, 1935   2 Sheets-Sheet 1

Louis Guarcello, Inventor.
By Emil Kenhart, Attorney

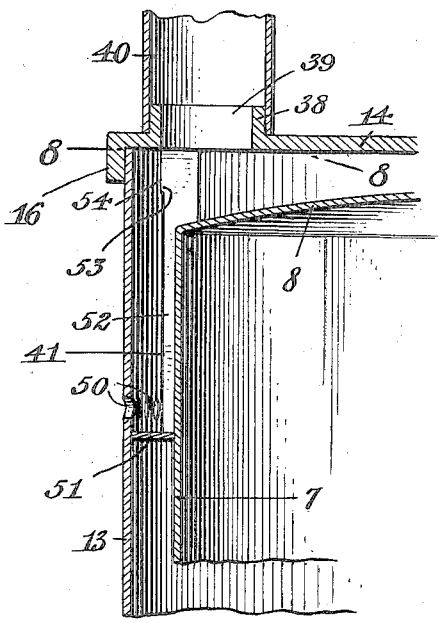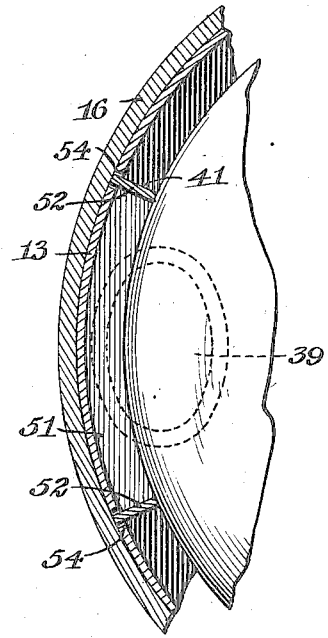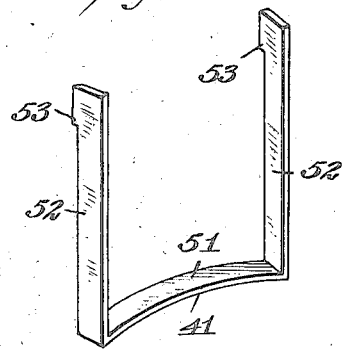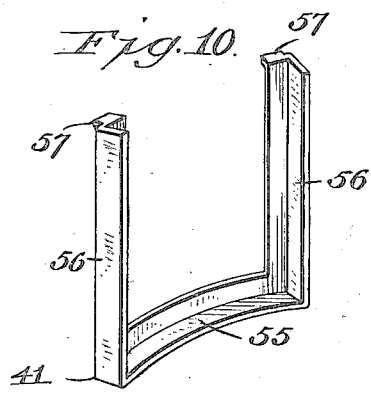

Patented Mar. 31, 1936

2,036,136

UNITED STATES PATENT OFFICE 2,036,136

WATER HEATER

Louis Guarcello, Silver Creek, N. Y.

Application January 15, 1935, Serial No. 1,888

9 Claims. (Cl. 122—19)

My invention relates to improvements in water heaters, and more particularly to that type in which the water within the heater is maintained at a predetermined temperature, determined by the adjustment of a thermostatic device co-acting with a valve controlling the supply of gas to a burner employed for heating the water.

The primary object of my invention is to provide a simple and inexpensive water heater wherein the usual pipes arranged outside of the heater and co-extensive therewith are disposed with.

Another object of my invention is to provide a new and novel means for furnishing the burner of the heater with the proper supply of air so that an effective flame is assured and a proper draft provided for the heater.

Another object of my invention is the provision of means which will assure the heat from the burner being directed around the tank or boiler portion of the heater in its course from the heating chamber to the smoke-stack and to provide the heater with improved means to guard against back-draft acting to extinguish the burner.

With the above and other objects to appear hereinafter, my invention consists in the novel features of construction, and in the arrangement and combination of parts to be hereinafter described and more particularly pointed out in the subjoined claims.

In the drawings:

Fig. 7 is an enlarged vertical section through the upper portion of the heater taken in the plane of the back-draft deflector and smoke or draft pipe, showing a modified form of deflector.

Fig. 8 is a horizontal section taken on or about line 8—8, Fig. 7.

Fig. 9 is a detached perspective view of a modified form of back-draft deflector shown in Figs. 7 and 8.

Fig. 10 is a detached perspective view of a still further modified form of back-draft deflector.

Having reference to the drawings in detail, like numerals refer to like parts in the several figures.

Figure 1:
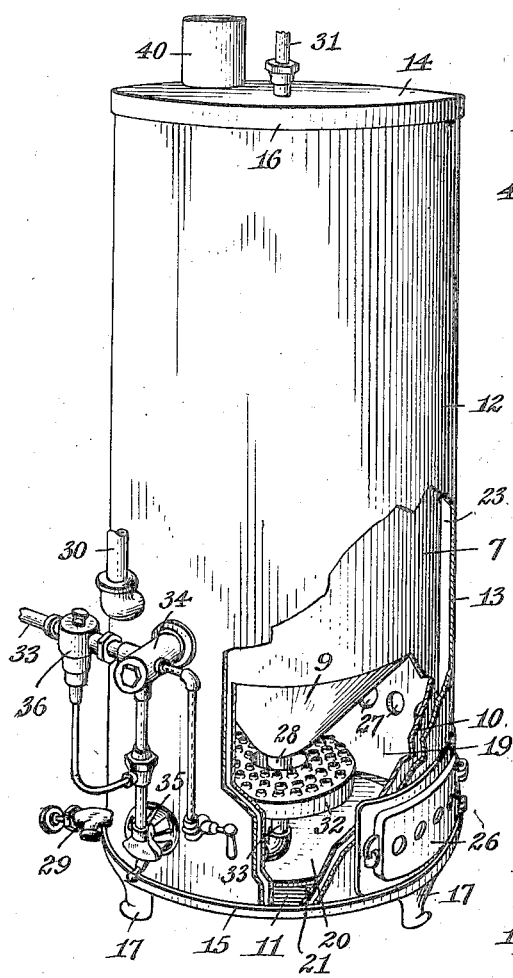
Fig. 1 is a perspective view of the complete heater, a portion of the casing and the apron of the tank or boiler being broken away to illustrate parts of the interior of the heater.
Figure 2:
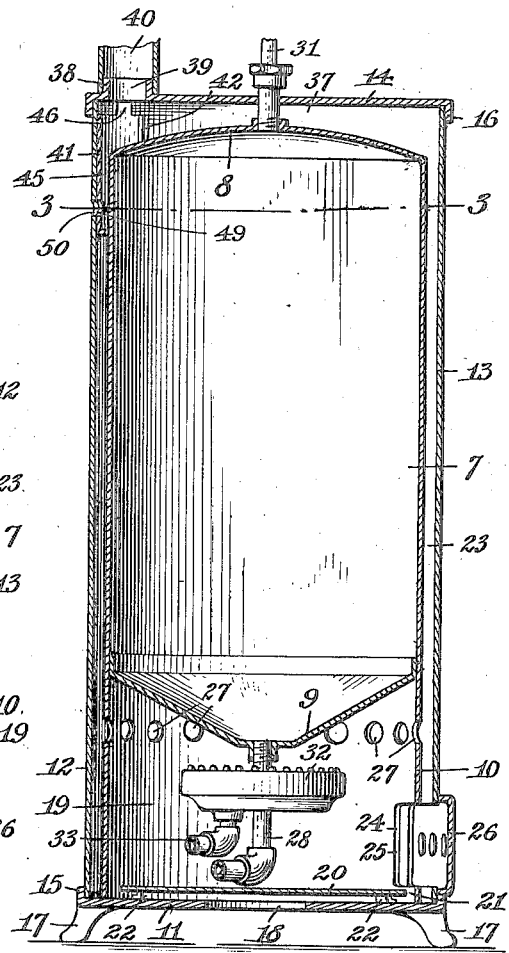
Fig. 2 is a central vertical section through the heater.
Figure 3:
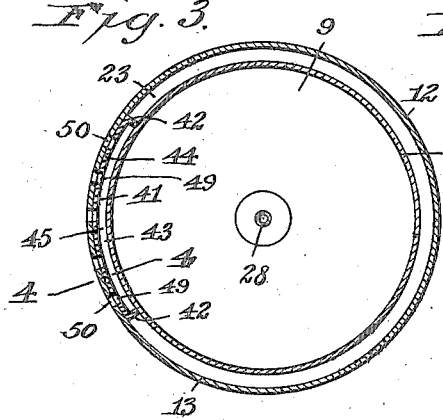
Fig. 3 is a horizontal section taken on line 3—3, Fig. 2.

The reference numeral 7 designates the hot water tank or boiler, which is constructed of heavy galvanized sheet metal and is preferably cylindrical in cross-sectional formation. It has a convex head 8 and a downwardly-tapering or conical bottom 9. The cylindrical side wall of this tank or boiler is extended downwardly beneath the downwardly-tapering or conical bottom 9, as at 10, and forms what may be termed an apron, the lower edge of which bears against the bottom 11 of a jacket or casing 12, which, although not so shown, is thoroughly insulated to prevent radiation of heat, as is common in heater constructions of this type. This jacket or casing comprises a cylindrical metallic shell or wall 13, which is open at the top and bottom and closed by the bottom 11 previously referred to, and by a top or cap member 14. The bottom 11 and the cap or top member 14 are preferably castings, the bottom 11 having an upstanding flange 15 surrounding the lower end of the cylindrical shell or wall 13, and the cap or top member having a depending flange 16 surrounding the upper end of said cylindrical shell or wall. The bottom is spaced from the floor or support by legs 17, and it has a central air inlet opening 18 of comparatively large size.

The apron 10 serves to support the tank or boiler and may be formed integral with the cylindrical wall of the latter. The downwardly-tapering or conical bottom 9 may be inserted upwardly into the cylindrical member, so formed, from the bottom or downwardly from the top, and it may be welded or otherwise fastened in place in a water-tight manner; or this apron may be separate from the cylindrical wall of the tank or boiler, as may be found desirable. It, however, serves as the cylindrical surrounding or confining wall of the burner chamber 19 located between the bottom 11 and the downwardly tapering or conical bottom 9 of the tank or boiler. In this burner chamber, or combustion chamber as it may be termed, a disk 20 is placed which is of somewhat smaller diameter than the cylindrical apron 10, so that an annular intervening space 21 is created between the edge of said disk and said shell. This disk is held elevated from the bottom 11 by means of feet or legs 22, and therefore serves as a baffle.

It is to be noted that the tank or boiler 7 is of smaller diameter than the jacket or casing 12, and therefore an annular intervening heat space 23 is provided between said tank or boiler and the jacket or casing; also between the apron 10 and said jacket or casing. Since, however, the apron 10 may be considered as forming part of the tank or boiler, this intervening space surrounds the tank or boiler from its upper end downwardly to the bottom 11 of the jacket or casing.

The cylindrical wall of the tank or boiler, and more particularly the apron 10 thereof and the jacket or casing 12, have registering openings 24, 25, respectively, near their lower ends, and these are closed by a door 26, which upon being opened, provides access to the burner or combustion chamber through said openings. The jacket or casing may be lined with suitable asbestos sheet material or otherwise insulated, as is common, and communication is established between the burner or combustion chamber and the annular heat space 23 through the medium of an annular series of draft openings 27 formed in the apron 10, preferably in a plane above that occupied by the burner, to be presently described.

Connected to a low point of the downwardly-tapering or conical bottom 9 of the tank or boiler is a drain pipe 28 which extends outwardly through the apron 10 and the jacket or casing 12, and has a valve 29 connected thereto outside of the jacket or casing, which upon being opened permits of draining the tank or boiler of sludge and other accumulated sediment.

A water inlet pipe 30 is passed through the jacket or casing and opens into the tank or boiler 7 in a plane above the bottom of the latter. A hot water outlet or discharge pipe 31 is connected to the head 8 of the tank or boiler.

Arranged within the burner or combustion chamber 19 is a gas burner 32, which may be of any desired construction and positioned in any desired manner, preferably a distance above the disk or baffle 20 at the bottom of the burner or combustion chamber 19. It is supplied with gas through the medium of a gas-supply pipe 33 which extends outwardly through the apron 10 and the jacket or casing 12, and has arranged therein in any approved manner a thermostatic control device 34 of the type generally referred to as the snap-action type. As this, however, forms no part of my invention I merely illustrate the same in a general way to make clear the automatic control of the gas, and might here state that a portion of this thermostatic control device extends into or at least is in communication with the interior of the tank or boiler 7. The action of this thermostatic control device is governed by the temperature of the water within said tank or boiler. A main gas valve 35 is arranged in the supply pipe 33 between the thermostatic control device and the gas burner, and a gas safety valve 36 is also arranged within the gas supply pipe 33, it being adapted to automatically close the gas supply pipe in case of gas shortage, so that when the return of the proper supply or pressure of gas is made, manual manipulation of this safety gas valve will be required in order to again light the gas burner, all of which is in common use in water heaters of this type, but the installation of which is invariably made for safety in the use of heaters of this type.

The top or cap member 14 of the jacket or casing is spaced a distance from the convex head 8 of the tank or boiler, as at 37, and is provided with an upstanding flange 38 at one side of its center surrounding a draft opening 39, preferably close to the cylindrical wall of the jacket or casing. Fitted over this flange is a smoke or draft pipe 40 which is intended for connection with a chimney or stack.

It will be clear from the foregoing that the annular heat space 23 opens into the space 37 above the tank or boiler, and that the draft opening 39 in the top or cap member 13 is approximately in line with said annular heat space. Although the burner or combustion chamber 19 is in communication with the annular heat space 23 through the annular series of draft openings 27 in the apron 10, the location of the draft opening 39 is such as would tend to draw a portion of the heat upwardly in a somewhat spiral manner, and under a back-draft would result in cold currents of air traveling downwardly along the tank or boiler at one side thereof and cause the flame of the burner to become extinguished. To guard against this I employ a combined deflector and guard 41, which is arranged in the upper portion of the annular heat space 23 directly beneath the draft opening 39 in the cap or top member 14, and which extends into the space 37 above the tank or boiler. This combined deflector and guard is formed of sheet metal curved to conform to the curvature of the jacket or casing 12, and it lies in contact with the inner surface of said jacket or casing, or more particularly against the insulation lining of said jacket or casing.

At opposite side edges of this curved metallic member, inwardly-directed flanges 42 are provided which are co-extensive therewith, and at the lower end of said curved metallic member an inwardly-directed flange 43 is provided which extends from one side flange 42 to the other. This combined deflector and guard may therefore be said to comprise a curved body portion 44, and the flanges 42 and 43, and these flanges are of a width that their major portions bear against the outer peripheral surface of the tank or boiler 7. Consequently, a pocket 45 is formed between the upper portion of the jacket or casing and the upper portion of the tank or boiler 7. In order to hold this combined deflector and guard in place, I provide the same at its upper edge with upwardly-extending ears 46 equipped with outwardly-directed flanges 47 which are fitted into notches 48 formed in the upper edge of the jacket or casing 12; this being best shown in Figures 4 to 6.

The curved body portion 44 of this combined deflector and guard is provided with a series of openings 49 and the jacket or casing is also provided with corresponding openings 50 which register with the openings in said body portion 44. It will be apparent therefore that the upward draft created through the use of the stack 40 tends to draw the heat, especially from the burner or combustion chamber through the draft openings 27 in the apron 10 and upwardly through the annular heat space 23 and around the combined deflector and guard 41, with the result that the heat has a tendency to travel upwardly in approximately vertical lines to the space 37, except when it reaches the combined deflector and guard, where it strikes the lower flange 43 of said deflector and guard and is directed laterally and thence upwardly along the side flanges 42, around the upper portions and over the upper ends of which it passes to the draft pipe or stack.

It will also be apparent that in the event of a down-draft being created through the stack, the air currents will be directed downwardly into the pocket 45 and escape out through the registering openings 49 and 50 in said deflector and guard and the jacket or casing, respectively; thus serving as a guard against the action of the down-draft, which would tend to travel downwardly and extinguish the burner and as a deflector to prevent direct upward draft through the heat space 23 in line with the draft opening 38 in the top or cap member 14.

Air is furnished to the gas or combustion chamber 19 through the comparatively large axial opening 18 in the bottom 11 of the jacket or casing, and is drawn in radial lines from this opening around the edge of the disk or baffle 20 and furnished to the burner equally from all sides. The proper mixture of gas and air initially furnished the burner is provided through the main gas valve 35, which is equipped with a regulating device to admit the proper quantity of air to the gas before delivering it to the burner, as is common.

The flames from the burner play against the downwardly-tapering or conical bottom of the tank or boiler, and the heat from the flames is carried out of the burner or combustion chamber 19 through the draft openings 27 in the apron and rise through the annular heat space 23 in contact with the cylindrical wall of the tank or boiler, and by use of the deflector 41, which may be referred to or may be termed a guard, or a combined deflector and guard, is caused to maintain a fair distribution around the tank or boiler until it reaches the space 37 above the boiler, when the action created by the up-draft in the stack 40 will draw the heat through said space to the draft opening 39.

From the foregoing it will be understood that I have provided a simple and effective water heater in which the connection of the water and gas pipes are such that they do not extend in an unsightly manner the full length of the heater, as commonly employed; and that I have provided means to guard against extinguishing the gas burner by the action of down-drafts in the heater; also that I have provided approximately an even distribution of heat around the tank or boiler in the upward travel of the heat toward the draft pipe; and that I have furthermore provided a new and novel means for supplying the burner or combustion chamber with air.

While in Figs. 1 to 7 I have shown a combined deflector and guard, cast to desired shape or form, in Figs. 7 to 9 a combined deflector and guard is shown which is formed of strip metal bent into substantially U-formation to provide a bottom member 51 and side members 52 extending upwardly from opposite ends of the said bottom member, the upper ends of said side members being widened to form the hooks or hangers 53 adapted to engage the lower walls of notches or slots 54 which are of considerable length when compared to the notches 48 which receive the outwardly-directed flanges of the combined deflector and guard shown in Figs. 1 to 7. The bottom member 51 is curved to conform to the curvature of the tank or boiler 7 and the jacket or casing 18. In this construction the space between the side members 52 is in direct communication with the outer air through the medium of the openings 50 in the wall of the jacket or casing. The relation of this modified form of deflector and guard to the smoke stack is, of course, the same as that shown in Figs. 1 to 7.

Figures 4, 5, 6:
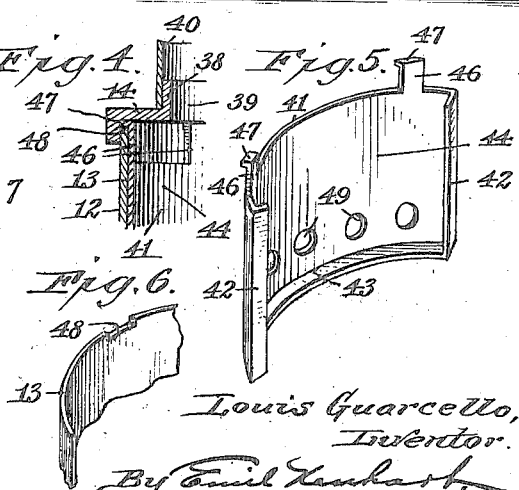
Fig. 4 is an enlarged vertical section through a portion of the heater casing taken on line 4—4, Fig. 3.
Fig. 5 is a detached perspective view of the back-draft deflector, which also serves as a means to more effectively direct the heat over the entire surface of the tank or boiler.
Fig. 6 is a perspective view of a portion of the upper part of the cylindrical jacket or casing.

The modified form of deflector and guard shown in Fig. 10 is similar to that shown in Fig. 9, with the exception that it is constructed of angle-bar material, slit or notched to enable it to be bent to desired form. In this instance, a curved bottom member 55 is provided, and spaced apart, upwardly-extending side member 56. One web of the angle material forming the side members is slightly longer than the other and bent outwardly to form hangers or hooks 57 adapted to enter suitable notches, such as 48 formed in the upper edge of the wall of the shell or casing, as shown in Fig. 6.

It will be apparent that when using either form of deflector and guard, a chamber is provided in the upper portion of the space between the tank or boiler and the jacket or casing, the space so provided having bottom and side walls and opening upwardly to the draft opening 39.

Having thus described my invention, what I claim is:

1. A water heater, comprising a cylindrical casing having a top provided with a draft opening at one side of its center, a draft pipe applied to said draft opening, a water tank within said casing separated from the cylindrical wall thereof by an annular intervening space and from said top, said draft opening being directly above said annular intervening space, a burner beneath said water tank, and a deflector in said intervening space in vertical alinement with said draft opening to cause the products of combustion to travel upwardly around all portions of said water tank and to prevent a direct upward passage of said products of combustion through said draft opening.

2. A water heater, comprising a cylindrical casing having a top provided with a draft opening in close proximity of the cylindrical wall of said casing, a draft pipe applied to said draft opening, a cylindrical water tank within said casing separated from the cylindrical wall thereof by an annular intervening space and from said top, a burner beneath said water tank and a deflector situated in the upper portion of said intervening space in line with said draft opening, said deflector being wider than said draft opening and causing the products of combustion traveling upwardly through the region in said intervening space beneath said deflector to be directed laterally in opposite directions so as to commingle with the products of combustion traveling upwardly in other portions of said intervening space before escaping through said draft opening.

3. A water heater, comprising a cylindrical casing having a top provided with a draft opening in close proximity to the cylindrical wall of said casing, a draft pipe applied to said draft opening, a cylindrical water tank within said casing separated from the cylindrical wall thereof by an annular intervening space and from said top, a burner beneath said water tank, and a combined guard and deflector situated in the upper portion of said intervening space beneath said draft-opening, said combined guard and deflector serving to prevent down-draft reaching said burner and to deflect the up-draft of the products of combustion traveling upwardly along the region of said intervening space directly beneath said draft-opening.

4. A water heater, comprising a cylindrical casing having a top provided with a draft-opening in close proximity to the cylindrical wall of said casing, a draft pipe applied to said draft opening, a cylindrical tank within said casing separated from the cylindrical wall thereof by an annular intervening space and from said top, a burner beneath said water tank, and means forming an arcuate pocket in the upper portion of said intervening space in line with said draft opening, said pocket being wider than said draft opening and having its bottom and sides closed and openings leading to the exterior of said casing.

5. A water heater, comprising a cylindrical casing having a top provided with a draft opening in close proximity to the cylindrical wall of said casing, a draft pipe applied to said draft opening, a cylindrical water tank within said casing separated from the cylindrical wall thereof by an annular intervening space and from said top, a burner beneath said water tank and a guard situated in the upper portion of said intervening space beneath said draft opening, said guard being formed of sheet metal and having a curved body portion provided at opposite side edges with inwardly-directed flanges and at its lower end with a flange extending from side flange to side flange, said body portion lying against the cylindrical wall of said casing and the edges of said flanges being in contact with the surface of said water tank.

6. A water heater, comprising a cylindrical casing having a top provided with a draft opening in close proximity to the cylindrical wall of said casing, a draft pipe applied to said draft opening, a cylindrical water tank within said casing separated from the cylindrical wall thereof by an annular intervening space and from said top, a burner beneath said water tank, and a guard situated in the upper portion of said intervening space beneath said draft opening, said guard being formed of sheet metal and having a curved body portion provided at opposite side edges with inwardly-directed flanges and at its lower end with a flange extending from side flange to side flange, said body portion lying against the cylindrical wall of said casing and the edges of said flanges being in contact with the surface of said water tank, said curved body portion and the wall of said casing having registering openings.

7. A water heater, comprising a cylindrical casing provided with a notch at its upper edge and having a top provided with a draft opening in close proximity to the cylindrical wall of said casing, a draft pipe applied to said draft opening, a cylindrical water tank within said casing separated from the cylindrical wall thereof by an annular intervening space and from said top, a burner beneath said water tank, and a guard situated in the upper portion of said intervening space beneath said draft opening, said guard being formed of sheet metal and having a curved body portion provided at its upper edge with an upstanding ear equipped with an outwardly-directed flange fitted into the notch at the upper edge of said cylindrical casing and with inwardly-directed flanges at its side and bottom edges, said body portion lying against the cylindrical wall of said casing and the edges of said flanges being in contact with the surface of said water tank and forming a pocket within said intervening space fully enclosed, and means of communication between said pocket and the air surrounding said casing.

8. A water heater, comprising a casing and a water tank within the casing separated from the wall of the latter by an intervening space, said casing having a draft opening at its upper end in more direct communication with one portion of said intervening space than the remaining portions thereof, a gas burner beneath said water tank, a guard within the portion of said intervening space in most direct communication with said draft opening, said guard being constructed to form a pocket having enclosing walls at the sides and bottom and having means of communication with the air surrounding said casing to permit any down-draft from said draft opening to enter said pocket and escape through said means of communication and to guard against said down drafts having effect upon said gas burner.

9. A water heater, comprising a cylindrical casing having notches in its upper edge and a top closing said cylindrical casing and provided with a draft opening, a cylindrical water tank within said casing separated from the cylindrical wall thereof by an intervening space, a gas burner beneath said water tank and a guard situated in the upper portion of the intervening space in that sector thereof most directly in communication with said draft opening, said guard comprising a curved body portion having inwardly-directed flanges at its sides and an inwardly-directed flange at its bottom extending from side flange to side flange and having also upwardly-extending lips equipped with outwardly-directed flanges at their upper ends fitted into the notches of the cylindrical wall of said casing to support said guard, said curved body portion and the cylindrical wall of said casing having a series of registering openings therein.

LOUIS GUARCELLO.